(12) United States Patent
Ando et al.

(10) Patent No.: US 7,954,165 B2
(45) Date of Patent: May 31, 2011

(54) SCANNING PROBE MICROSCOPE

(75) Inventors: Toshio Ando, Ishikawa (JP); Mitsuru Sakashita, Ishikawa (JP); Takayuki Uchihashi, Ishikawa (JP)

(73) Assignee: National University Corporation Kanazawa University, Ishikawa (JP)

( * ) Notice: Subject to any disclaimer, the term of this patent is extended or adjusted under 35 U.S.C. 154(b) by 265 days.

(21) Appl. No.: 12/095,953

(22) PCT Filed: Oct. 12, 2006

(86) PCT No.: PCT/JP2006/320415
§ 371 (c)(1),
(2), (4) Date: Jul. 21, 2008

(87) PCT Pub. No.: WO2007/072621
PCT Pub. Date: Jun. 28, 2007

(65) Prior Publication Data
US 2009/0133168 A1 May 21, 2009

(30) Foreign Application Priority Data

Dec. 19, 2005 (JP) ................................ 2005-364797

(51) Int. Cl.
*G01Q 10/06* (2010.01)
*G01Q 60/34* (2010.01)
(52) U.S. Cl. ............................... 850/4; 850/38; 977/851
(58) Field of Classification Search .................. 850/4, 38; 977/850, 851
See application file for complete search history.

(56) References Cited

U.S. PATENT DOCUMENTS

| 4,851,671 A * | 7/1989 | Pohl .................................. 850/4 |
| 7,703,314 B2 * | 4/2010 | Abe et al. ........................ 73/105 |

FOREIGN PATENT DOCUMENTS

| JP | 0 290 647 | 11/1988 |
| JP | 6-103176 | 12/1994 |
| JP | 2002-162334 | 6/2002 |
| JP | 2004-156959 | 6/2004 |

OTHER PUBLICATIONS

Kodera et al., "Dynamic proportional-integral-differential controller for high-speed atomic force microscopy", Review of Scientific Instruments, vol. 77, No. 8, 2006, pp. 083704-1-083704-7.*
English abstract of Mitsuru, Sakashita et al., "Cantilever Reishin Kyodo no Seigyo ni yoru Kosoku AFM Imaging no anteika", Biophysics, Oct. 19, 2005; vol. 45, Supplement 1, p. 110, 1P316.
International Search Report Dated Jan. 9, 2007.
Jens Schiener et al.; "Stabilized atomic force microscopy imaging in liquids using second harmonic of cantilever motion for setpoint control"; Review of Scientific INstruments, 4002.08; vol. 75, No. 8, pp. 3564-3568.

* cited by examiner

*Primary Examiner* — Jack I Berman
(74) *Attorney, Agent, or Firm* — Pearne & Gordon LLP

(57) ABSTRACT

A scanning probe microscope is provided, which can be stably used for a long time even if excitation efficiency varies during scan. A cantilever (5) is excited, and the cantilever (5) and a sample are subjected to relative scanning. A second-harmonic component detection circuit (31) detects second-harmonic component amplitude of oscillation of the cantilever (5) as integral-multiple component amplitude. The second-harmonic component amplitude is amplitude of a second-harmonic component having a frequency twice as high as excitation frequency. An excitation intensity adjustment circuit (33) controls excitation intensity based on the detected second-harmonic component amplitude such that the second-harmonic component amplitude is kept constant.

8 Claims, 4 Drawing Sheets

[FIG.1]
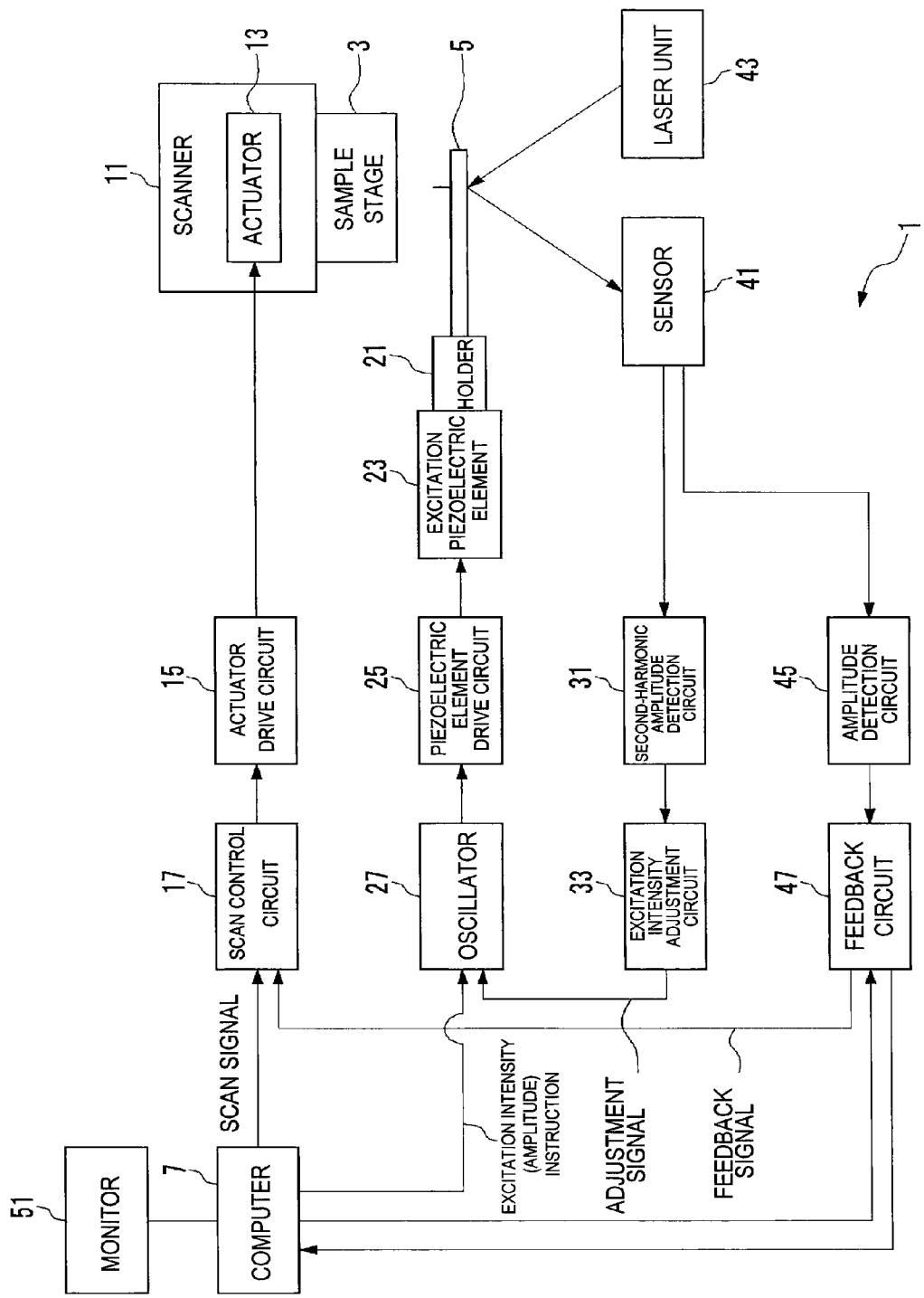

[FIG.2]
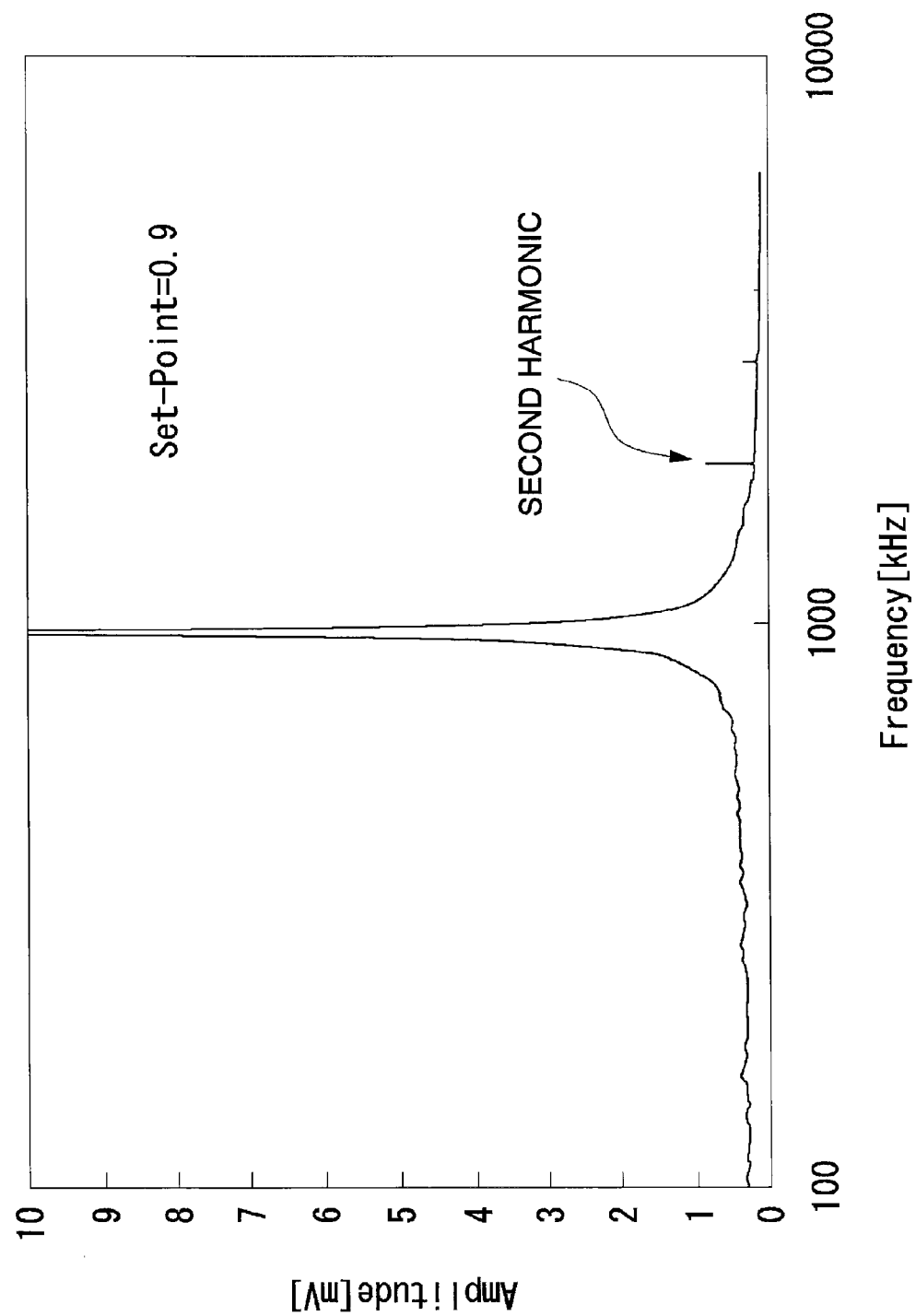

[FIG.3]
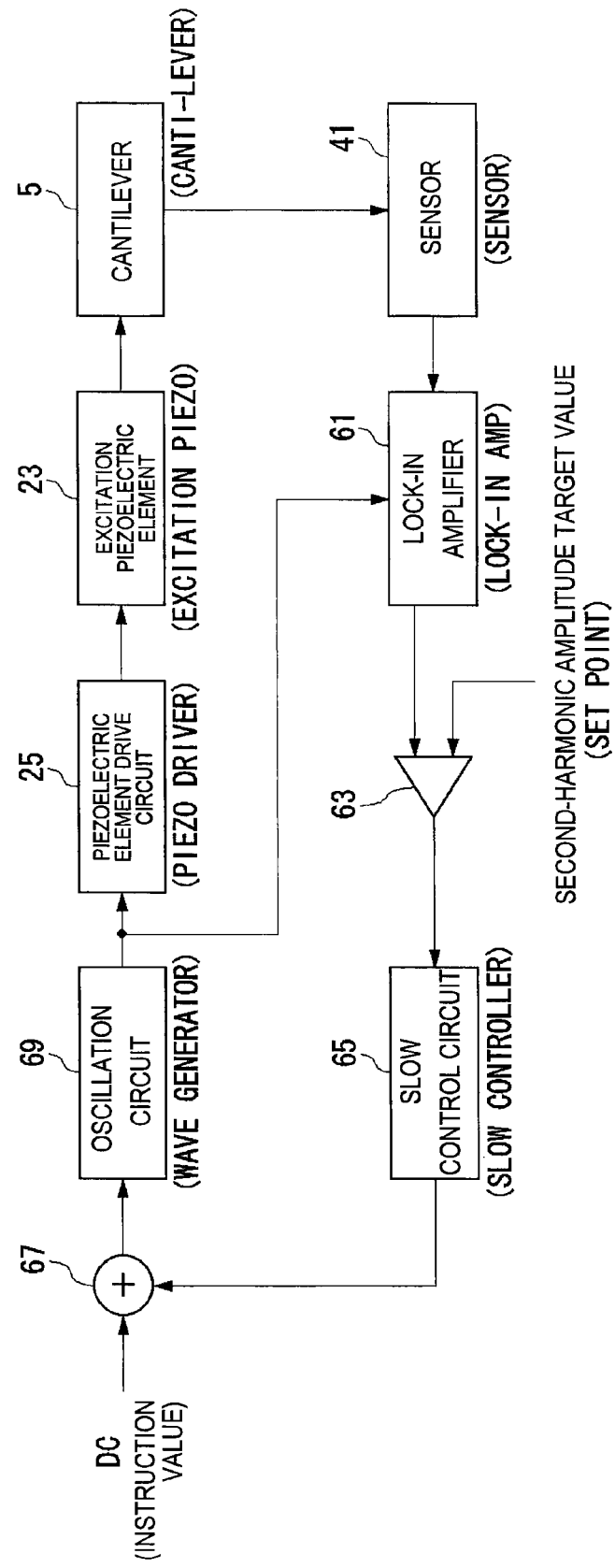

[FIG.4]
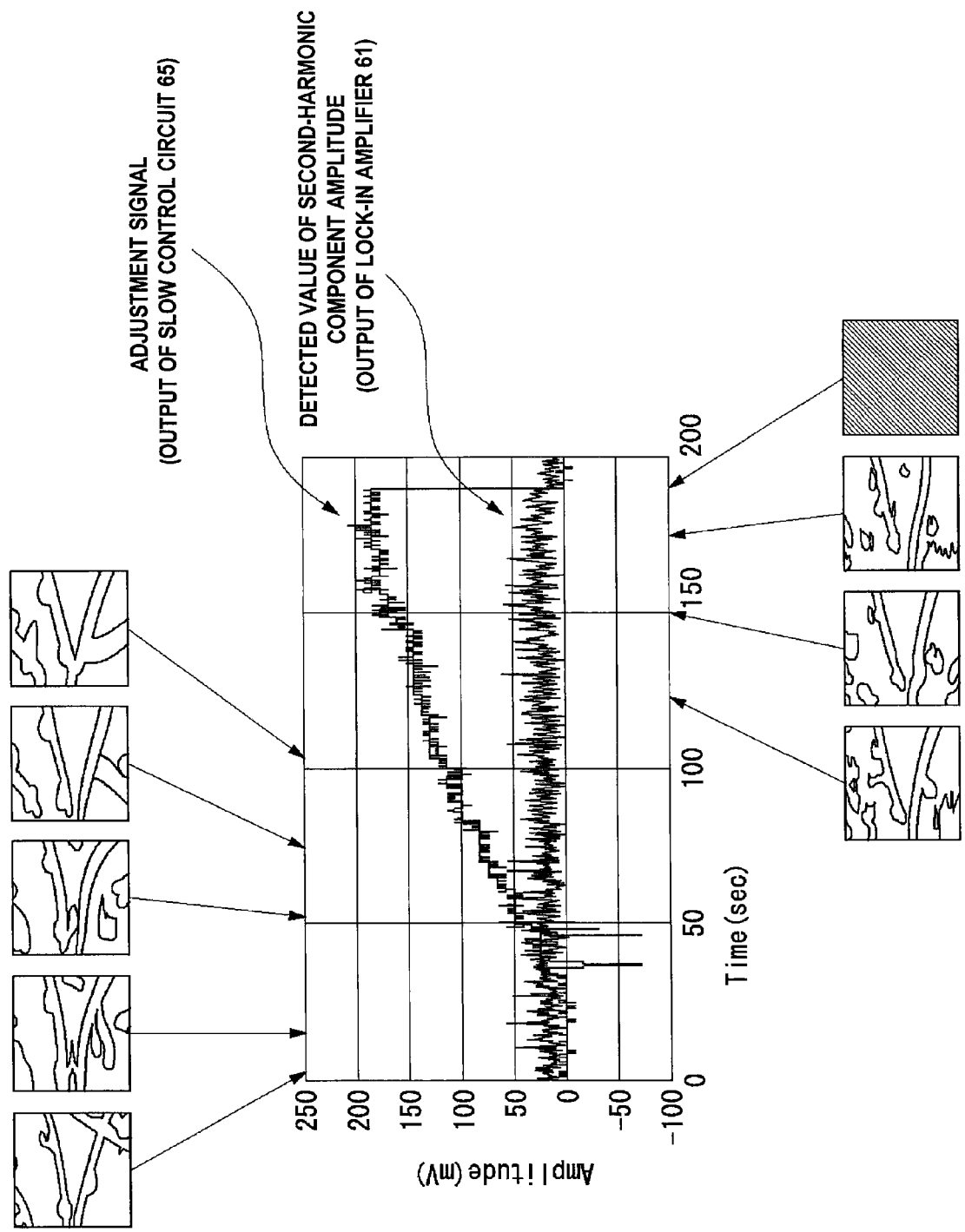

SCANNING PROBE MICROSCOPE

TECHNICAL FIELD

The present invention relates to a scanning probe microscope, and particularly relates to a technique for exciting a cantilever.

BACKGROUND ART

As a typical scanning probe microscope (SPM), a scanning tunneling microscope (STM) and an atomic force microscope (AFM) have been known. Among them, AFM has a cantilever having a probe at a free end, a displacement sensor for detecting displacement of the cantilever, and a sample stage scanner. In AFM, the cantilever is oscillated at a frequency near resonance frequency by oscillating a piezoelectric element, and a probe of the oscillating cantilever is contacted to a sample. Oscillation amplitude of the cantilever is decreased by contact with the sample. Based on output of the displacement sensor, the cantilever and the sample are relatively scanned with a decreased amplitude amount being kept.

To keep the decreased amplitude amount constant, an amplitude target value (set-point) is set. The amplitude target value is set slightly small compared with free oscillation amplitude. For example, the amplitude target value is set 0.9 times as large as the free oscillation amplitude. An amplitude value is detected by the displacement sensor during scanning a sample stage in X and Y directions, and the sample stage is subjected to feedback control in a vertical direction (Z direction) such that the amplitude value corresponds to the amplitude target value.

When the amplitude value is smaller than the amplitude target value, AFM determines that the probe is excessively close to the sample, and moves the sample stage to be away from the cantilever. On the other hand, when the amplitude value is larger than the amplitude target value, AFM determines that the probe is excessively away from the sample, and moves the sample stage close to the cantilever. By such feedback scan, a distance between the sample and the probe is kept constant, and information such as surface morphology of the sample is obtained by a feedback signal or the like.

In such feedback scan, excitation efficiency of the cantilever is supposed to be constant. The excitation efficiency is conceptually equal to magnitude of actual oscillation intensity (amplitude "A") of the cantilever against excitation intensity (amplitude "A0") of an excitation source, and can be expressed by an amplitude ratio (kA/A0, k is constant). The excitation source is, for example, the piezoelectric element excitation source. Actual amplitude of the cantilever is influenced by the cantilever and other relevant elements. For example, in use of the cantilever in a liquid, the amplitude of the cantilever is influenced by the surrounding liquid. Based on such various factors, the amplitude of the cantilever is determined, and excitation efficiency is also determined.

However, it is known that the excitation efficiency varies during scan in actual AFM. For example, when the excitation efficiency decreases, amplitude of the cantilever is decreased. In this case, AFM determines that the probe is excessively close to the sample, and moves the sample stage to be away from the cantilever. As the excitation efficiency decreases, the probe of the cantilever is more moved to be away from a surface of the sample, eventually the probe is perfectly separated from the surface of the sample, and as a result, the AFM can not perform imaging.

Such drift of excitation efficiency is the largest problem among various types of drift. Imaging for long time (several minutes) is difficult because of the drift. The problem exists in both a fast-type atomic force microscope and a typical atomic force microscope.

Conventionally, when the excitation efficiency is tried to be detected, the oscillation amplitude needs to be measured while the probe is perfectly separated from a surface of the sample to obtain the free oscillation amplitude. The measurement can not be performed during actual imaging scan. Therefore, even if the conventional detection method is applied, the drift of the excitation efficiency can not be corrected during scan.

When the drift of the excitation efficiency occurs, a relationship between amplitude and a target value of the amplitude varies, and as a result, imaging is adversely influenced as described above. To cope with such a problem, Schiener et al. perform PI control to the amplitude target value based on a fact that an amplitude signal of second harmonic resonance (a component of frequency twice as high as the primary resonance frequency) of the cantilever is sensitive to intensity of contact between the probe and the sample (Schiener et al., "Stabilized atomic force microscopy imaging in liquids using second harmonic of cantilever motion for set-point control", Review Of Scientific Instrument, American Institute of Physics, August 2004, Volume 75, Number 8, pp. 2564-2568). However, the method is disadvantageous in that as a result of changing a target value, force exerted between the probe and the sample is changed during scan.

Among types of AFM, non-contact AFM is known in addition to contact AFM. The non-contact AFM is used with the probe being close to the sample. The problem of excitation efficiency is not a problem only in the contact AFM. The same problem may occur in the non-contact AFM.

DISCLOSURE OF THE INVENTION

Problems that the Invention is to Solve

The present invention was made based on the background, and an object of the present invention is to provide a scanning probe microscope that can be stably used for a long time even if excitation efficiency varies during scan.

Means for Solving the Problems

An aspect of the present invention is a scanning probe microscope for oscillating a cantilever and performing relative scanning between the cantilever and a sample, and the scanning probe microscope includes an excitation section for exciting the cantilever, an integral-multiple (integral harmonic) amplitude detection section for detecting an integral-multiple component amplitude (or integral harmonic component amplitude or integral-multiple harmonic component amplitude) that is amplitude of a frequency component as an integral multiple of excitation frequency of the cantilever, and an excitation intensity adjustment section for adjusting excitation intensity of the excitation section based on the detected integral-multiple component amplitude.

According to another aspect of the present invention, a scanning probe microscope oscillates a cantilever and performs relative scanning between the cantilever and a sample. The scanning probe microscope includes the cantilever, an oscillation circuit for oscillating the cantilever, an integral-multiple amplitude detection circuit for detecting an integral-multiple component amplitude that is amplitude of a component of frequency as an integral multiple of excitation frequency of the cantilever, and an excitation intensity adjustment circuit for adjusting excitation intensity of an excitation source of the cantilever based on the detected integral-multiple component amplitude.

Still another aspect of the invention is a cantilever excitation device for exciting a cantilever, which is used in a scanning probe microscope for oscillating the cantilever and performing relative scanning between the cantilever and a sample, the excitation device including an integral-multiple amplitude detection section for detecting an integral-multiple component amplitude that is amplitude of a component of frequency as an integral multiple of excitation frequency of the cantilever, and an excitation intensity adjustment section for adjusting excitation intensity of an excitation source of the cantilever based on the detected integral-multiple component amplitude.

Still another aspect of the invention is a cantilever excitation method of exciting a cantilever, which is used in a scanning probe microscope for oscillating a cantilever and performing relative scanning between the cantilever and a sample, and the method includes exciting the cantilever at a set or given excitation frequency, detecting an integral-multiple component amplitude that is amplitude of a component of frequency as an integral multiple of the excitation frequency of the cantilever, and adjusting excitation intensity of an excitation source of the cantilever based on the detected integral-multiple component amplitude.

As described above, in the present invention, integral-multiple component amplitude of oscillation of the cantilever is detected, and excitation intensity is adjusted based on the integral-multiple component amplitude. The integral-multiple component amplitude is sensitive to intensity of contact between a probe and a sample. The excitation intensity is intensity (amplitude) of an excitation source which is, for example, a piezoelectric element excitation source. According to the present invention, even if excitation efficiency varies, the excitation intensity is adjusted and controlled at the excitation source side to keep the integral-multiple component amplitude, thereby at the cantilever side, actual contact intensity and amplitude of a probe portion are kept (more specifically, contact intensity and amplitude (resonance) as long-time average independent of irregularity of the sample are kept). Therefore, the microscope can be stably used for a long time.

Thus, in the present invention, excitation intensity is controlled based on the integral-multiple component amplitude, thereby even if excitation efficiency varies, the microscope can be stably used for a long time.

The invention may be applied to both the contact AFM (Intermittent Contact AFM) and the non-contact AFM. Specifically, in the contact AFM, a cantilever contacts to a sample, and the contact AFM detects amplitude of an integral-multiple harmonic component of the contacting cantilever. On the other hand, in the non-contact AFM, a cantilever is close to a sample, and the non-contact AFM detects amplitude of integral-multiple harmonic component of the close cantilever. The non-contact AFM utilizes interaction force (which is weak) existing between the probe and the sample even though the probe is not contacted to the sample. A relationship between the interaction force and the integral-multiple harmonic component may be used similarly as a relationship between the contact force and the integral-multiple harmonic component in the contact AFM, thereby the present invention may be applied to the non-contact AFM. This is similarly applied in the following description.

As described hereafter, other aspects of the invention exist. Thus, this disclosure of the invention is intended to provide a few aspects of the invention and is not intended to limit the scope of the invention described and claimed herein.

BRIEF DESCRIPTION OF THE DRAWINGS

FIG. 1 shows a block diagram of an atomic force microscope of an embodiment of the present invention;
FIG. 2 shows a power spectrum of cantilever oscillation;
FIG. 3 shows a configuration of an excitation function of the atomic force microscope; and
FIG. 4 shows an effect of excitation intensity control according to the embodiment.

BEST MODE FOR CARRYING OUT THE INVENTION

A detailed explanation of the invention will be hereinafter described. The detailed explanation and the accompanying drawings do not limit the invention. Instead, the scope of the invention is limited by claims attached hereto.

In this embodiment, the present invention is applied to an atomic force microscope (AFM).

FIG. 1 shows a configuration of AFM in the embodiment. In a general configuration, AFM 1 has a sample stage 3, cantilever 5, configuration of scanning the sample stage 3 in X, Y and Z directions, configuration of oscillating the cantilever 5 at a frequency near resonance frequency, configuration of detecting displacement of the cantilever 5, configuration for feedback scan for keeping amplitude of the cantilever 5 constant, and computer 7 controlling overall apparatus.

The sample stage 3 is configured to hold a sample at a bottom. The sample stage 3 is attached to a scanner 11 having an actuator 13. The actuator 13, which includes a piezoelectric element, moves the sample stage 3 in X, Y and Z directions to perform relative scanning of the sample to the cantilever 5. In FIG. 1, the X and Y directions are directions being perpendicular to each other on a horizontal plane, and the Z direction is a vertical direction. The Z direction is an unevenness direction (height direction) of the sample. The actuator 13 is driven by an actuator drive circuit 15 which is controlled by a scan control circuit 17.

The cantilever 5 is made of silicon nitride, and has a probe at a free end. The cantilever 5 is held by a holder 21. The holder 21 is provided in conjunction with an excitation piezoelectric element 23 which is driven by a piezoelectric element drive circuit 25. An oscillator 27 is a sine-wave oscillator. According to an excitation signal supplied from the oscillator 27, the piezoelectric element drive circuit 25 oscillates the excitation piezoelectric element 23 to induce oscillation of the cantilever 5. The oscillator 27 is controlled by the computer 7, and supplied with an instruction signal indicating excitation intensity (amplitude) from the computer 7.

As a feature of the embodiment, a second-harmonic amplitude detection circuit 31 and an excitation intensity adjustment circuit 33 are provided in order to prevent influence of drift of excitation efficiency of the cantilever 5. Configurations of them are described in detail later.

A sensor 41 configures a displacement sensor in an optical lever type in cooperation with a laser unit 43. The laser unit 43 irradiates laser light to the cantilever 5. The laser light is reflected from the cantilever 5 and reaches the sensor 41. The sensor 41 includes a photodiode, and outputs a signal indicating displacement of the cantilever 5. In the figure, a configuration of an optical system including lenses associated with the sensor is omitted.

The AFM 1 has an amplitude detection circuit 45 and a feedback circuit 47 for feedback scan. The amplitude detection circuit 45 processes a displacement signal inputted from the sensor 41 to obtain amplitude of the cantilever 5. Here, amplitude of an excitation frequency component (primary component) is obtained.

A detected amplitude value is outputted into the feedback circuit 47. The feedback circuit 47 is inputted with an amplitude target value from the computer 7. The feedback circuit 47 has a subtracter for subtracting the amplitude target value from the detected amplitude value to produce a deviation signal, and a PID circuit for amplifying the deviation signal, and produces a feedback signal by using such components. An amplitude target value of the feedback scan is supplied from the computer 7. The amplitude target value may be manually set by using an appropriate circuit configuration.

The feedback signal is supplied to a scan control circuit 17 to be used for the feedback scan. Furthermore, the feedback signal is supplied to the computer 7 to be used for processing of producing a sample image.

The computer 7 controls overall the AFM 1. The computer 7 also provides a user interface function. Various types of instructions by a user are inputted into the computer 7, and the computer 7 controls the AFM 1 according to the user input. Moreover, the computer 7 produces an image of a sample surface and outputs it on a monitor 51.

Next, general operation of the AFM 1 is described. The scan control circuit 17 is supplied with a control signal of scan in the X and Y directions. The scan control circuit 17 controls an actuator drive circuit 15 according to the control signal to allow an actuator 13 to perform the scan in the X and Y directions. Moreover, the computer 7 supplies an instruction value of excitation intensity (amplitude) to the oscillator 27. The oscillator 27 produces an excitation signal under control of the computer 7, and supplies the excitation signal to a piezoelectric element drive circuit 25. The piezoelectric element drive circuit 25 drives the excitation piezoelectric element 23, so that the cantilever is oscillated at the frequency near the resonance frequency. In this way, while the cantilever 5 is oscillated, the cantilever 5 and the sample are subjected to relative scanning in the X and Y directions.

During X and Y scan, the sensor 41 detects displacement of the cantilever 5, and the amplitude detection circuit 45 obtains amplitude of the cantilever 5. Then, based on the amplitude target value supplied from the computer 7, the feedback circuit 47 produces a feedback signal depending on difference between the detected amplitude value and the amplitude target value. The feedback signal is supplied to the scan control circuit 17, and the scan control circuit 17 controls the actuator drive circuit 15 according to the feedback signal such that the detected amplitude value coincide with the amplitude target value. A distance between the cantilever 5 and the sample is kept constant by the feedback control.

Thus, the X and Y scan is performed while performing Z scan for keeping the distance between the cantilever 5 and the sample constant. The feedback signal for the Z scan is further supplied from the feedback circuit 47 to the computer 7. The feedback signal corresponds to height in the Z direction of the sample. A position in the X and Y directions on the sample is specified by a control signal for the X and Y scan which is produced by the computer 7 and supplied to the scan control circuit 17. Based on control data of the X and Y scan and the input feedback signal, the computer 7 produces an image of a sample surface and displays it on the monitor 51. A three-dimensional image is preferably produced and displayed.

Hereinbefore, general configuration and operation of the AFM 1 were described. Next, a configuration and a method of preventing influence of drift of excitation efficiency are described, which are characteristic of the embodiment.

As previously described, drift of excitation efficiency is given as a problem of the AFM 1. When excitation efficiency is supposed to be constant, good image is not obtained due to the drift of excitation efficiency.

Thus, the invention provides a new technique for compensating the drift of excitation efficiency during imaging scan.

In oscillation of the cantilever, the following phenomena (1) to (4) are seen.

(1) When the probe is not contacted to the sample, oscillation of the cantilever has only the same frequency component as excitation frequency $F_c$.

(2) When the probe is contacted to the sample, frequency components as integral multiples of $F_c$ appear.

(3) Magnitude of amplitude of respective components has the following relationship: second harmonic>third harmonic>fourth harmonic>....

(4) Oscillation amplitude of the second harmonic is sensitive to contact between the probe and the sample.

FIG. 2 shows power spectrum of cantilever oscillation, showing the above phenomena. FIG. 2 shows data when the cantilever is oscillated, the probe of the cantilever is contacted to a substrate, and amplitude of a lever is 90% of free oscillation amplitude. As shown in the figure, frequency components as integral multiples of the excitation frequency appear. A relationship of magnitude of amplitude is as follows: second harmonic>third harmonic>fourth harmonic.

As above, the second harmonic component is sensitive to contact between the probe and the sample. Therefore, if amplitude of the second harmonic component is kept constant, intensity of contact between the probe and the sample is kept constant, consequently actual amplitude in a probe portion is kept constant. Even when excitation efficiency varies, if actual contact intensity and amplitude can be kept constant in the probe portion, AFM can be continuously used in a stable manner.

Thus, according to the above principle, the AFM 1 controls excitation intensity of the piezoelectric element as an excitation source intensity based on the amplitude of the second harmonic component. The AFM 1 extracts only the second harmonic component from an oscillation signal of the cantilever 5, measures the amplitude of the second harmonic component, and adjusts intensity of the excitation source to ensure the amplitude to be constant. In the embodiment, I-control is performed. The intensity of the excitation source is automatically adjusted using an integrating circuit having a large time constant. The intensity at the excitation source side is adjusted in this way, thereby the actual contact intensity and amplitude at the cantilever side can be kept constant.

As shown in FIG. 1, the AFM 1 has the second-harmonic component amplitude detection circuit 31 and the excitation intensity adjustment circuit 33.

The second-harmonic component amplitude detection circuit 31 is inputted with a displacement signal of the cantilever 5 from the sensor 41. The displacement signal indicates oscillation of the cantilever 5. The second harmonic amplitude detection circuit 31 detects the amplitude of the second harmonic component of the excitation frequency based on the signal from the sensor, and outputs it into the excitation intensity adjustment circuit 33. The second-harmonic amplitude detection circuit 31 may be controlled by the computer 7. The second harmonic amplitude detection circuit 31 may use information of the excitation frequency supplied from the oscillator 27.

The excitation intensity adjustment circuit 33 adjusts excitation intensity based on the amplitude of the second harmonic component detected by the second-harmonic amplitude detection circuit 31. More specifically, the excitation intensity is subjected to feedback control to ensure the amplitude of the second harmonic component to be constant. The excitation intensity adjustment circuit 33 receives a second-harmonic amplitude target value (amplitude target value of the second harmonic component) from the computer 7, and supplies an adjustment signal (feedback signal) to the oscillator 27, the adjustment signal being depending on difference between the detected amplitude of the second harmonic component and the second harmonic amplitude target value. The second-harmonic amplitude target value is preferably set to amplitude of a second harmonic component at a start point of scan. The second harmonic amplitude target value may be set experimentally or computationally. It is also acceptable that the AFM 1 is actually operated for imaging, and the second harmonic amplitude target value is adjusted to ensure excellent imaging to be carried out. The second-harmonic amplitude target value may be manually set by using an appropriate circuit configuration.

The oscillator 27 incorporates an adder. The oscillator 27 adds an adjustment signal supplied from the excitation intensity adjustment circuit 33 to an excitation intensity instruction value (amplitude instruction value) supplied from the computer 7. Then, the oscillator 27 produces an excitation signal according a signal after addition. The cantilever 5 is excited according to the excitation signal, thereby the second-harmonic component amplitude is controlled to coincide with the target value.

The oscillator 27 used in the AFM 1 is further described. The oscillator 27 has an adder for gain adjustment, and is configured such that it varies amplitude of a sine wave by adding an external signal to a DC signal of the instruction value. The instruction value of excitation intensity is inputted from the computer 7 as the DC signal of the instruction value. Moreover, an adjustment signal is inputted from a slow control circuit (reference 65 in FIG. 3 and reference 33 in FIG. 1) as the external signal. When the external signal is added, an output signal is changed in proportion to a signal after addition.

FIG. 3 shows the above configuration more specifically. In FIG. 3, the AFM 1 has a lock-in amplifier 61, a differential amplifier 63, a slow control circuit 65 (SLOW CONTROLLER), an adder 67, and an oscillation circuit 69 (WAVE GENERATOR).

The lock-in amplifier 61 corresponds to the second-harmonic amplitude detection circuit 31 in FIG. 1. The lock-in amplifier 61 has a function of a bandpass filter having an extremely narrow band. The lock-in amplifier 61 is inputted with a sensor displacement signal from the sensor 41. Moreover, the lock-in amplifier 61 is inputted with an output signal (excitation signal) from the oscillation circuit 69 as a reference signal for specifying the excitation frequency. The lock-in amplifier 61 extracts a frequency component twice as high as the excitation frequency from the sensor displacement signal, produces a signal having amplitude of the second-harmonic component, and output it into the differential amplifier 63. In description of a detailed circuit configuration omitted in FIG. 3, the lock-in amplifier 61 detects the second harmonic component, consequently output power of the lock-in amplifier 61 is small. Thus, an amplifier is preferably provided between the lock-in amplifier 61 and the differential amplifier 63.

The differential amplifier 63 and the slow control circuit 65 correspond to the excitation intensity adjustment circuit 33 in FIG. 1. The differential amplifier 63 outputs a signal depending on difference between the detected second-harmonic component amplitude and the second-harmonic amplitude target value. The slow control circuit 65 is an integrating circuit having a large time constant. The slow control circuit 65 has a function of slowing adjustment speed of the excitation intensity to speed corresponding to long time such as time for acquiring at least one image in the AFM 1. For example, the adjustment speed is preferably set to speed corresponding to time approximate 1 to 10 times longer than the time for acquiring one image. That is, the integrating circuit is configured such that it has a time constant corresponding to time for acquiring approximate 1 to 10 images (approximate several images). Therefore, influence of variation in cantilever oscillation amplitude due to irregularity of the sample can be prevented.

The adder 67 and the oscillation circuit 69 correspond to the oscillator 27 in FIG. 1. As above, the oscillator 27 incorporates a function of the adder 67. An output signal from the slow control circuit 65 is inputted into the adder 67. The adder 67 is further inputted with the DC signal of the excitation intensity instruction value from the computer 7. The adder 67 adds the adjustment signal supplied from the slow control circuit 65 to the excitation intensity instruction value. A signal after addition is supplied to the oscillation circuit 69, and used for excitation of the excitation piezoelectric element 23. Therefore, the excitation intensity is adjusted depending on difference between the detected value and the target value of the second-harmonic component amplitude, so that the detected value of the second-harmonic component amplitude is controlled to coincide with the target value.

FIG. 4 shows an effect of adjusting the excitation intensity according to the embodiment. FIG. 4 shows change in second-harmonic component amplitude and adjustment signal with a lapse of time. A measurement object is a complex of actin filament and myosin V which is adsorbed on a mica substrate. Measurement time is 180 sec (3 min). The second-harmonic component amplitude is output of the lock-in amplifier 61 in FIG. 3, which corresponds to a detected value of amplitude of the second harmonic component. The adjustment signal is output of the slow control circuit 65 in FIG. 3. Images in the figure are images obtained at respective time points during measurement.

In FIG. 4, while the adjustment signal increases in level with the passage of time, the second harmonic component amplitude is kept constant. The increase in level of adjustment signal means that the excitation intensity was necessary to be increased to keep the second harmonic component amplitude constant. This means that the excitation efficiency has drifted, and more specifically, means that the excitation efficiency has decreased in an example of the figure. Further, it is known that although the excitation efficiency has drifted, the second harmonic component is kept constant by supplying the adjustment signal, and long time average of intensity of contact between the probe and a sample substrate is constant (the long time average is average in sufficiently long time compared with actual imaging).

As shown in FIG. 4, according to the AFM 1 of the present embodiment, stable imaging is carried out during measurement. While free oscillation amplitude is kept constant by keeping the second harmonic component amplitude constant, feedback scan is performed based on amplitude of an excitation frequency component (primary component), and thereby imaging is preferably performed.

Furthermore, in FIG. 4, when 180 sec has passed, the adjustment signal is stopped to be supplied. When stopping supply of the adjustment signal, excitation intensity is returned to an instruction value from the computer 7. Since actual excitation efficiency has decreased, amplitude of the cantilever 5 suddenly decreases. Therefore, in Z direction scan, primary-component amplitude becomes smaller than a target value. Then, the cantilever 5 is moved to be away from the sample, and eventually separated from the sample, and as a result, imaging is disabled as shown in the figure. Again from this, it is known that adjustment of excitation intensity according to the embodiment is effective.

In the example of FIG. 4, imaging speed is 200 msec/frame. The AFM 1 of the embodiment is preferably used also for faster imaging. Moreover, the AFM 1 of the embodiment may be preferably used for observing nano-function movement of bio-molecules, and may be preferably used for observing motion of live protein in liquids.

Next, a modification of the embodiment is described. In the configuration of FIG. 3, the lock-in amplifier 61 is used for extracting the second harmonic component. However, other configurations may be used to detect the second-harmonic component amplitude. For example, the AFM 1 may have a bandpass filter having a narrow band instead of the lock-in amplifier 61. A displacement signal of the cantilever 5 may be passed through the bandpass filter to detect amplitude of the second harmonic component.

In the example of the specific configuration, the oscillator 27 incorporated the adder 67. However, the adder 67 may not be incorporated in the oscillator 27. Alternatively, the same function may be realized by a different configuration. For example, the same configuration may be realized by providing a multiplier at an output side of the oscillator. More specifically, first, an adjustment signal is added with an appropriate reference voltage (for example, 1 V) by the adder disposed at an output side of the slow control circuit 65. The adjustment signal is thereby converted into a signal varying near the reference voltage. The signal is inputted into the multiplier disposed at the output side of the oscillator, and multiplied with output of the oscillator. Accordingly, the excitation intensity is adjusted as in the circuit configuration of FIG. 3.

In the embodiment, automatic adjustment of the second-harmonic component amplitude is realized by the integrating circuit. However, the same function may be obtained by a different configuration. For example, the same function may be realized by using a digital circuit.

In the embodiment, the cantilever 5 was excited by the piezoelectric element. However, the method of the embodiment is independent of excitation methods of the cantilever. The cantilever 5 may be excited by a configuration other than the piezoelectric element. For example, the cantilever 5 may be excited by light. Moreover, a magnetized cantilever may be excited by an AC magnetic field.

In the case of using light, the cantilever 5 is irradiated with laser light for excitation, and the cantilever 5 is deformed by heat. Intensity of the laser light is periodically oscillated, causing oscillation of the cantilever 5. A second-harmonic component amplitude of the oscillation of the cantilever 5 is detected. Then, the intensity of the laser light is adjusted as excitation intensity such that the second-harmonic amplitude component is kept constant. Similarly, in the case of using magnetic force, the second-harmonic component amplitude is detected, and the excitation intensity is adjusted such that the second-harmonic component is kept constant.

The second-harmonic amplitude detection circuit 31 is an example of an integral-multiple amplitude detection circuit or an integral-multiple amplitude detection section. Amplitude of another integral-multiple component, for example, amplitude of a third-harmonic component may be detected and used for adjustment and control of excitation intensity. A target value is appropriately set depending on a component to be used. However, the second-harmonic component is advantageous in that it is sensitive to contact intensity of the probe, and has comparatively large amplitude.

In the embodiment, the contact AFM was mainly supposed, and the invention was applied to the contact AFM. In the contact AFM, the cantilever is contacted to the sample, and amplitude of an integral-multiple harmonic component of the contacting cantilever is detected. However, the invention may be applied to the non-contact AFM. In an example of application to the non-contact AFM, the cantilever is close to the sample, and amplitude of an integral-multiple harmonic component of the close cantilever is detected. The non-contact AFM utilizes interaction force existing between the probe and the sample without contact of the probe and the sample though it is weak. Even such weak interaction slightly changes amplitude and a phase (phase difference between an excitation signal and cantilever oscillation) of the cantilever. A relationship between the interaction force and the integral-multiple harmonic component is used in the same way as a relationship between the contact force and the integral-multiple harmonic component in the contact AFM. Accordingly, the invention is applied to the non-contact AFM in the same way as the contact AFM.

In the embodiment, the sample was held on the bottom of the sample stage. However, the sample may be held on a top of the sample stage. The cantilever may be disposed above the sample stage.

The cantilever may not be made of silicon nitride. For example, the cantilever may be made of silicon.

Hereinbefore, the preferred embodiment of the invention was described. In the present invention, integral-multiple component amplitude of oscillation of a cantilever is detected, and excitation intensity is adjusted based on the integral-multiple component amplitude. The integral-multiple component amplitude is sensitive to intensity of contact between a probe and a sample. The excitation intensity is intensity (amplitude) of an excitation source which is, for example, a piezoelectric element excitation source. When excitation efficiency varies, actual oscillation intensity and amplitude of the cantilever against the excitation intensity and amplitude of the excitation source vary. In the present invention, the excitation intensity of the excitation source is adjusted to keep the integral-multiple component amplitude constant. When the integral-multiple component amplitude is kept constant, the actual oscillation intensity and amplitude of the cantilever are kept constant. That is, since oscillation intensity at an excitation source side is adjusted based on the integral-multiple component amplitude, the actual oscillation intensity and amplitude at a cantilever side are kept constant. Accordingly, even if the excitation efficiency varies, a microscope can be stably used.

As described before, the present invention may be applied to both the contact AFM and the non-contact AFM. In the non-contact AFM, a relationship between the interaction force between the probe and the sample and the integral-multiple harmonic component is used similarly as a relationship between the contact force and the integral-multiple harmonic component in the contact AFM.

In the invention, second-harmonic component amplitude may be detected as integral-multiple component amplitude. The second-harmonic component amplitude is large compared with amplitude of other integral-multiple components such as third harmonic component and fourth harmonic component. Therefore, the second-harmonic component amplitude is comparatively large, and easily detected. Therefore, excitation intensity can be easily adjusted by using the second-harmonic component amplitude.

In the scanning probe microscope of the present invention, the excitation intensity may be controlled such that the integral-multiple component amplitude is kept constant. By controlling the integral-multiple component amplitude to be constant, intensity of oscillation can be kept constant, and consequently the microscope can be stably used for a long time.

Moreover, in the scanning probe microscope of the present invention, the excitation intensity may be adjusted with a speed corresponding to time for acquiring at least one image by scan of the cantilever. More specifically, an integrating circuit may be provided, the circuit having a time constant corresponding to time for acquiring at least one image. Adjustment speed and the time constant may be preferably set to be corresponding to multiple-image acquisition time or more for acquiring a plurality of sample images. Thus, the adjustment speed and the time constant may be set correspondingly to time for acquiring a plurality of images, and more specifically, the adjustment speed and the time constant may be set correspondingly to time for acquiring approximate 10 images as the above example. By performing such processing, influence of change in amplitude of an integral-multiple component depending on irregularity of the sample can be avoided, consequently an excellent image is obtained.

While the currently conceivable, preferred embodiment of the invention has been described hereinbefore, it will be appreciated that various variations and modifications can be made to the embodiment, and it is intended that all such variations and modifications within the spirit of truth and the scope of the invention are included by the attached claims.

INDUSTRIAL APPLICABILITY

The scanning probe microscope of the present invention can be used, for example, for observing nano-function movement of bio-molecules.

The invention claimed is:

1. A scanning probe microscope for oscillating a cantilever and performing relative scanning between the cantilever and a sample, comprising:
    an excitation section for exciting the cantilever,
    an integral-multiple amplitude detection section for detecting an integral-multiple component amplitude that is amplitude of a frequency component as an integral multiple of excitation frequency of the cantilever, and
    an excitation intensity adjustment section for adjusting excitation intensity of the excitation section based on the detected integral-multiple component amplitude.

2. The scanning probe microscope according to claim 1, wherein
    the integral-multiple amplitude detection section includes a second-harmonic amplitude detection section for detecting second-harmonic component amplitude that is amplitude of a second-harmonic component having a frequency twice as high as the excitation frequency.

3. The scanning probe microscope according to claim 1, wherein
    the excitation intensity adjustment section controls the excitation intensity such that the integral-multiple component amplitude is kept constant.

4. The scanning probe microscope according to claim 1, wherein
    the excitation intensity adjustment section includes a slow control section for adjusting the excitation intensity with a speed corresponding to time for acquiring at least one image by scan of the cantilever.

5. The scanning probe microscope according to claim 4, wherein
    the excitation intensity adjustment section includes an integrating circuit having a time constant corresponding to the time for acquiring at least one image.

6. A scanning probe microscope for oscillating a cantilever and performing relative scanning between the cantilever and a sample, comprising:
    the cantilever,
    an oscillation circuit for oscillating the cantilever,
    an integral-multiple amplitude detection circuit for detecting an integral-multiple component amplitude that is amplitude of a component of frequency as an integral multiple of excitation frequency of the cantilever, and
    an excitation intensity adjustment circuit for adjusting excitation intensity of an excitation source of the cantilever based on the detected integral-multiple component amplitude.

7. A cantilever excitation device for exciting a cantilever, which is used in a scanning probe microscope for oscillating the cantilever and performing relative scanning between the cantilever and a sample, the device comprising:
    an integral-multiple amplitude detection section for detecting an integral-multiple component amplitude that is amplitude of a component of frequency as an integral multiple of excitation frequency of the cantilever, and
    an excitation intensity adjustment section for adjusting excitation intensity of an excitation source of the cantilever based on the detected integral-multiple component amplitude.

8. A cantilever excitation method of exciting a cantilever, which is used in a scanning probe microscope for oscillating the cantilever and performing relative scanning between the cantilever and a sample, the method comprising:
    exciting the cantilever at a set excitation frequency,
    detecting an integral-multiple component amplitude, which is amplitude of a component of frequency as an integral multiple of the excitation frequency of the cantilever, and
    adjusting excitation intensity of an excitation source of the cantilever based on the detected integral-multiple component amplitude.

* * * * *